(12) United States Patent
Griffis et al.

(10) Patent No.: US 7,320,496 B2
(45) Date of Patent: Jan. 22, 2008

(54) SEALING ARRANGEMENT FOR A TRANSIT VEHICLE

(75) Inventors: David C. Griffis, Round Lake, IL (US); Wieslaw W. Tomczyk, Wheeling, IL (US); Fotios Golemis, Skokie, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 11/586,308

(22) Filed: Oct. 25, 2006

(65) Prior Publication Data
US 2007/0039242 A1 Feb. 22, 2007

Related U.S. Application Data

(62) Division of application No. 10/729,494, filed on Dec. 5, 2003, now Pat. No. 7,143,546.

(51) Int. Cl.
*B60J 1/14* (2006.01)
(52) U.S. Cl. .................. 296/146.1; 296/146.9; 49/308; 49/309; 49/316; 49/321

(58) Field of Classification Search ............. 49/303, 49/306, 307, 308, 309, 316, 321; 296/146.1, 296/146.4, 146.9
See application file for complete search history.

(56) References Cited

U.S. PATENT DOCUMENTS

| 170,029 | A | 11/1875 | Sustins |
| 282,208 | A | 7/1883 | McCurdy |
| 902,143 | A | 10/1908 | Frigone |
| 1,311,127 | A | 7/1919 | Kendrick |
| 1,342,050 | A | 6/1920 | La Jeunesse |
| 1,345,832 | A | 7/1920 | Campbell |
| 1,578,328 | A | 3/1926 | Lessing |
| 1,785,431 | A | 12/1930 | Bailey |
| 1,913,285 | A | 6/1933 | Oliver et al. |
| 3,072,977 | A | 1/1963 | Burda |
| 5,522,180 | A | 6/1996 | Adler et al. |
| 6,550,186 | B2 | 4/2003 | Haq |

*Primary Examiner*—Gregory J. Strimbu
(74) *Attorney, Agent, or Firm*—The Webb Law Firm

(57) ABSTRACT

A sealing arrangement for a door of a transit vehicle with an angularly disposed floor portion incorporates a rotatably disposed driving member in combination with a driven member attached to the sealing arrangement to enable vertical movement thereof for providing a weather seal when the door is closed and accommodating the angularly disposed floor portion when the door is open and the door is disposed within the transit vehicle and above the floor portion. An inner and outer cover may be provided at the bottom edge of the door for esthetic purposes.

12 Claims, 4 Drawing Sheets

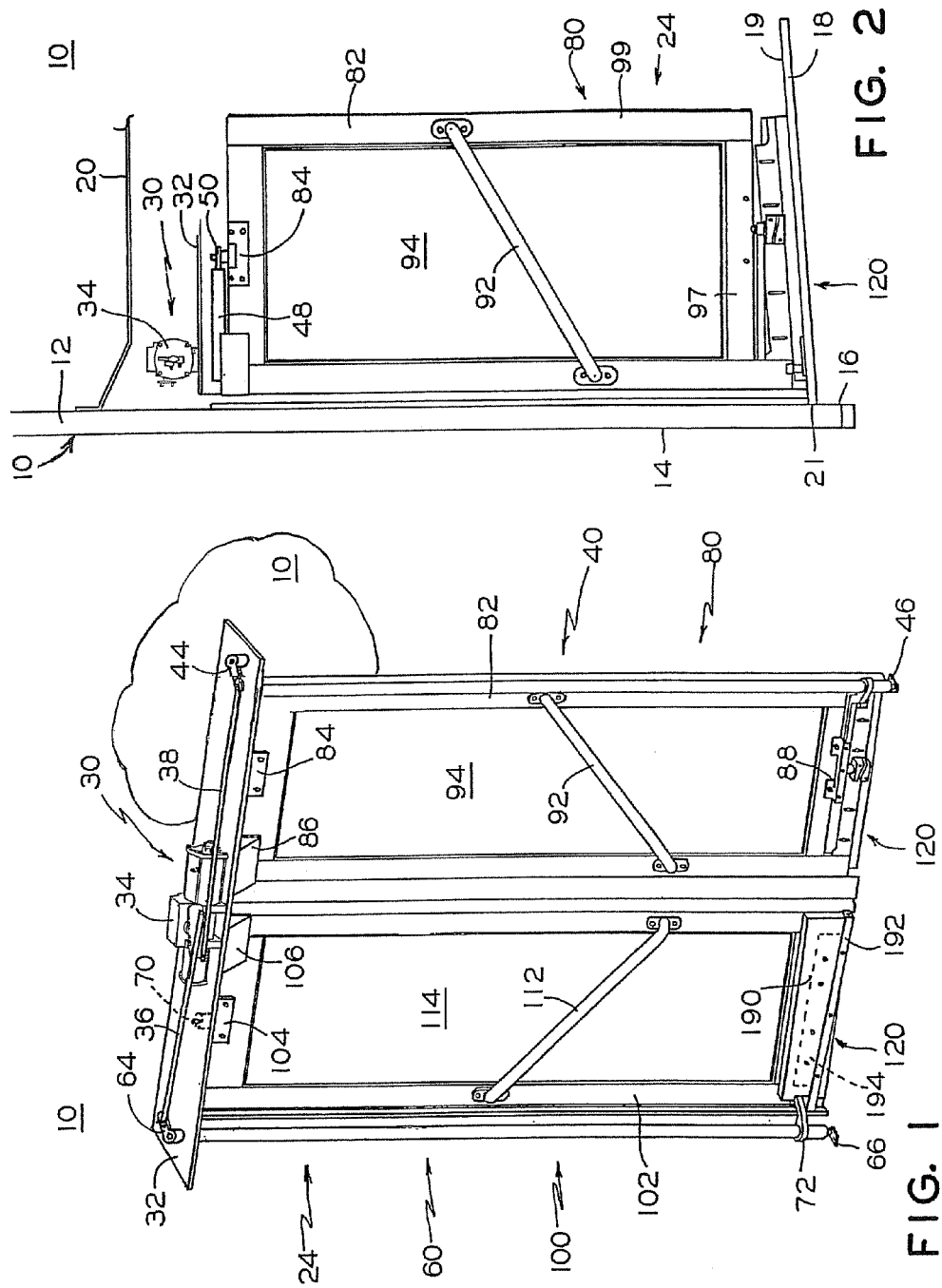

SEALING ARRANGEMENT FOR A TRANSIT VEHICLE

CROSS REFERENCE TO RELATED APPLICATION

This application is a divisional of U.S. patent application Ser. No. 10/729,494 filed Dec. 5, 2003 now U.S. Pat. No. 7,143,546.

BACKGROUND OF THE INVENTION

1. Field of the Invention

The present invention relates, in general, to a sealing arrangement adapted for use with both a level and a sloped surface and, more particularly, the instant invention relates to a sealing arrangement for a transit vehicle utilizing a slide-glide door type and, still more particularly, the instant invention relates to a sealing arrangement for a transit vehicle utilizing a slide-glide door type adapted for operation with a sloped floor.

2. Description of Related Art

The following background information is provided to assist the reader to understand the environment in which the invention will typically be used. The terms used herein are not intended to be limited to any particular narrow interpretation unless specifically stated otherwise in this document.

Sealing arrangements are generally utilized around a perimeter of a movable object especially in applications requiring sealing against environmental factors such as moisture, wind, and dust. They consist of materials such as rubber or brush, which are suitable to close required gaps between the movable object and a surrounding structure, yet enable low frictional forces during movement.

Most typical applications using such sealing arrangements include exterior doors of a swing or pivot type used in buildings and transit vehicles.

The use of such sealing arrangement in conjunction with the present invention will be explained as used in a particular application within a transit vehicle.

Door systems of a slide-glide arrangement are well known in the art of transit vehicles in general and buses in particular. Such door systems include at least one door disposed within a portal aperture for at least partially covering and uncovering such portal aperture for passenger ingress and egress. The at least one door has top and bottom pivotal attachments to a door post which is vertically disposed at the edge of such portal aperture. The door post is connected to a door operator and is adapted for a 180 degree rotation.

The at least one door is constrained for linear movement of a leading edge by the top bracket and typically contains a sealing means, such as a brush, at the bottom thereof for sealing against environmental factors. The portal aperture is disposed adjacent an interior floor portion and typically incorporates an outer edge of the floor portion as a bottom edge thereof.

For uncovering the portal aperture, such at least one door is rotatable by the combination of the door operator and the door post from a first position being disposed substantially planar within such portal aperture to a second position being disposed perpendicular to the portal aperture and further being disposed within the interior portion of such transit vehicle. In such second position such at least one door is disposed above the floor portion of such transit vehicle and its leading edge is facing outwardly toward the exterior of the transit vehicle.

In a traditional design of the transit vehicle the floor portion adjacent such portal aperture is disposed substantially leveled with the ground enabling constant interface with the bottom edge of the at least one door during rotational movement.

Lately, new types of transit vehicles employ sloped floor portions for an improved transition between the ground level and the main floor portion. The slope begins at such portal aperture and elevates toward a main floor portion. It is well known in such transit vehicles that a sealing arrangement at the bottom edge of such at least one door must accommodate the sloped floor portion being disposed in a second position and accommodate a level edge of such floor portion being in the first position.

Traditional means of accomodating a sloped floor employ an increased gap between the bottom edge of such at least one door with increased height of the sealing arrangement to enable the bottom edge of the at least one door to clear the sloped floor portion. However, such arrangement causes bending of the sealing arrangement and further causes premature wear and deterioration thereof.

SUMMARY OF THE INVENTION

The present invention overcomes the disadvantages of the prior art door system by providing a sealing arrangement for a door of the transit vehicle which is adapted for vertical movement during the rotation of the door between closed and open positions. In the open position the door is disposed above the angular floor portion of the transit vehicle. The door has pivotal connections to a well known door post and is rotatable thereby between the open and closed positions. The sealing arrangement includes a mounting member, a sealing member, which is typically a brush, attached to the mounting member, a motion conversion means containing a driving member attached to the door post and engaging a driven member attached to the mounting member, and a pivot connection at a leading edge of the door. The driving member has a guiding portion thereof disposed within a helix aperture of the driven member. During the rotation of the door from the closed into the open position enabled by the rotating door post, the rotation of driving member causes the driven member to move vertically thus enabling vertical movement of the sealing arrangement. The pivot connection, at the leading edge which enables only the horizontal movement, causes the edge of the sealing arrangement disposed adjacent a trailing edge of the door to move vertically as well as resulting in an angular displacement of the sealing arrangement when the door is disposed in the open position above the angular floor portion. The predetermined pitch of the helix aperture enables a predetermined vertical movement at the trailing edge to provide a predetermined clearance with the angular floor portion. Inner and outer covers are provided for esthetic purposes and a safety member may be provided adjacent the inner cover to prevent a pinch hazard to the passenger while the door is moving into the closed position.

It is, therefore, one of the primary objects of the present invention to provide a sealing arrangement for a door system of a transit vehicle which accomodates a sloped floor portion.

It is another object of the present invention to provide a sealing arrangement for a door system of a transit vehicle which accomodates a sloped floor portion without bending or deformation.

It is yet another object of the present invention to provide a sealing arrangement for a door system of a transit vehicle which is visually estetic to the riding passengers.

It is a further object of the present invention to provide a sealing arrangement for a door system of a transit vehicle which eliminates pinch point hazards.

It is yet a further object of the present invention to provide a sealing arrangement for a door system of a transit vehicle which incorporates adjustments to compensate for interface and component tolerances.

It is an additional object of the present invention to provide a sealing arrangement for a door system of a transit vehicle which is easily retrofitable in existing applications.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE DRAWINGS

FIG. 1 is a perspective view of the door system of the present invention with the door system in a closed position;

FIG. 2 is a partial planar side view of the present invention particularly illustrating a transit vehicle interface and the door in an open position;

DETAILED DESCRIPTION OF THE INVENTION

Figure 3:
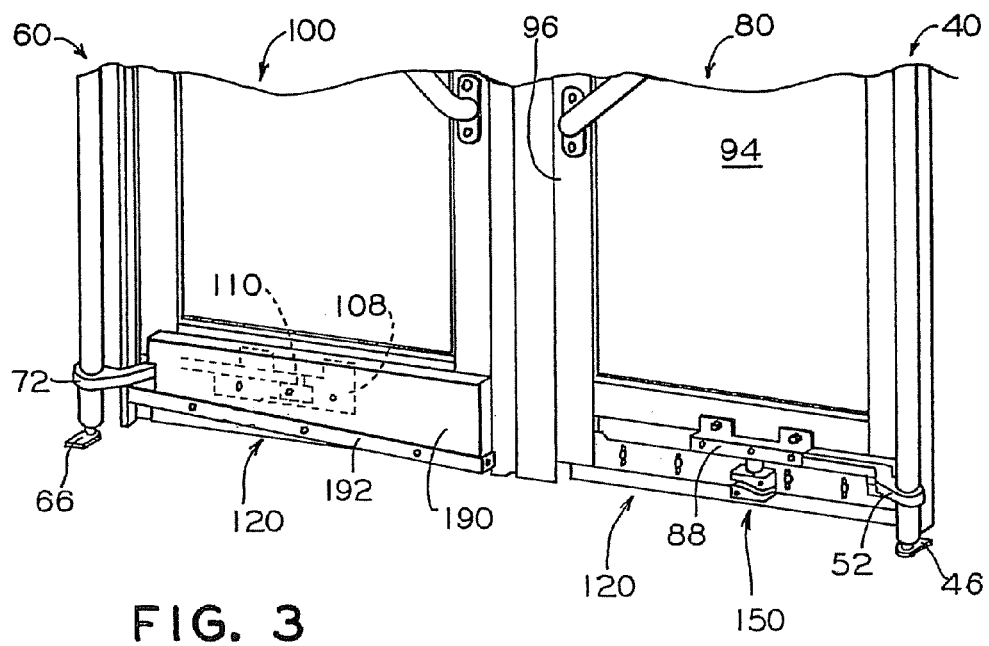
FIG. 3 is is a partial perspective view of the door system of the present invention particularly illustrating a brush assembly interface.

Before describing the invention in detail, the reader is advised that, for the sake of clarity and understanding, identical components having identical functions have been marked where possible with the same reference numerals in each of the figures provided in this document.

A door system, generally designated 24, for a transit vehicle, generally designated 10, according to the present invention, is best illustrated in FIGS. 1 through 4. The transit vehicle 10 includes a side wall member 12 which has an outer surface 14 and an inner surface 16, a floor portion 18 and a ceiling portion 20.

The floor portion 18 has a surface 19 which is angularly disposed in relationship to the side wall member 12 and is further angularly disposed in relationship to the horizontal plane elevating from the inner surface 16 into the interior of the transit vehicle 10. A generally level front edge 21 of the floor portion 18 forms a base of a portal aperture (not shown) which is disposed within the side wall member 12. The portal aperture (not shown) contains the door system 24 for covering and uncovering thereof to enable passenger ingress and egress.

As best illustrated in FIG. 2, the door system 24 contains a door drive means, generally designated 30, disposed adjacent the portal aperture (not shown) and preferably disposed adjacent the ceiling portion 20. A base member 32 of the door drive means 30 is rigidly attached to the inner surface 16 of the wall member 12 but could be attached to the ceiling portion 20. The base member 32 houses a prime mover 34 which could be of any well known electrical, mechanical, pneumatic or hydraulic type. The prime mover 34 has at least one drive linkage 36 but preferably a pair of drive linkages 36 and 38.

A first door rotation enabling means, generally designated 40, of a well known door post type, is disposed vertically within the transit vehicle 10 adjacent the inner surface 16 of the side wall member 12 and generally has a first pivot connection 44 with the drive linkage 38 and preferably has a second pivot connection 46 at the floor portion 18. The first door post 40 further includes an upper arm 48 with an upper pivot means 50 and a lower arm 52 with a lower pivot means 54.

Alternatively, the door drive means 30 may be attached to the first door post 40 at the second pivot connection 46.

A first door, generally designated 80, is best illustrated in FIG. 1 as being in a first position which is a substantially closed position disposed planar with the side wall member 12 and is best illustrated in FIG. 2 as being in a second position which is a substantially open position disposed perpendicularly to the side wall member 12 above the floor portion 18.

Such first door 80 comprises a door body member 82 normally having a glazing aperture 94, a leading edge 96, a bottom edge 97, and a trailing edge 99. The first door 80 has an upper mounting bracket 84 with an upper pivot for coupling with an upper pivot means 50 of the first door post 40. A lower mounting bracket 88 with a lower pivot 90 is provided for coupling with the first door post 40. A handle 92 may be adapted for mounting on the door body member 82 for use by the passengers. A guide bracket 86 is adapted for linear movement within the portal aperture (not shown) enabling the first door 80 to move from the first position to the second position upon rotation of the first door post 40 in a clockwise direction as illustrated in FIG. 1. As such the first door 80 is disposed within the interior of the transit vehicle 10 in such second position.

Generally, the upper pivot 50 and the lower pivot 90 are disposed adjacent the vertical centerline of the first door 80.

The door system 24 further includes a second door rotation enabling means of a door post type, generally designated 60, disposed opposite the first door post 40. The second door post 60 has a third pivot connection 64 with the drive linkage 38 and preferably has a forth pivot connection 66 at the floor portion 18. Such second door post 60 normally further includes an upper arm, with an upper pivot means 70, and a lower arm 72 with a lower pivot means 74.

A second door, generally designated 100, disposed adjacent the first door 60 within the portal aperture (not shown), comprises a door body member 102 generally having a glazing aperture 114 and a leading edge. The second door 100 has an upper mounting bracket 104 with an upper pivot for coupling with an upper pivot means 70 of the second door post 60. A lower mounting bracket 108 with a lower pivot 110 is provided for coupling with the second door post 60. A handle 112 may be adapted for mounting on the body member 102 for passenger use. A guide bracket 106 is adapted for linear movement within the portal aperture (not shown) enabling the second door 100 to move from the first position to the second position upon rotation of the second door post 60 in a counter-clockwise direction as illustrated in FIG. 1. As such the second door 100 is disposed within the interior of the transit vehicle 10 in such second position.

In favor of brevity the following description will be concerned with the first door 80 as those skilled in the art will readily understand that operation of the second door 100 is identical to operation of the first door 80 other than the direction of rotation.

Figure 4:
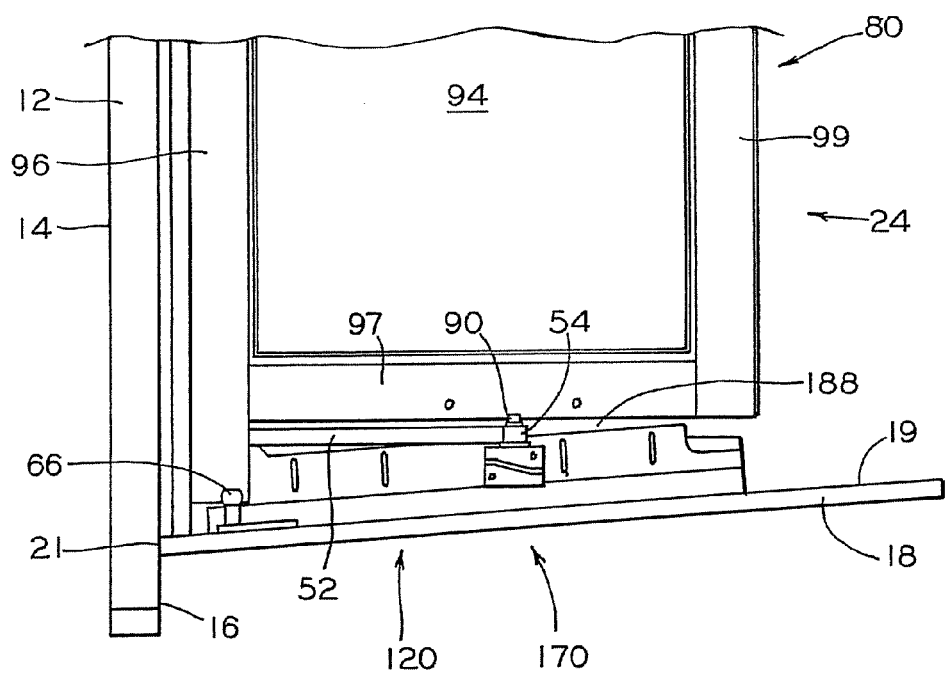
FIG. 4 is a partial planar side view of the present invention particularly illustrating a door in an open position.

A sealing arrangement of the present invention, generally designated 120, is best illustrated in FIGS. 3 through 8. The sealing arrangement 120 is adapted for sealing the bottom edge 97 of the first door 80 from the external environmental conditions such as noise, dust and moisture, while such first door 80 is in the first position covering the portal aperture (not shown) as best illustrated in FIG. 3. The sealing arrangement 120 is further adapted for vertical movement in order to accommodate a sloped floor portion 18 while such first door 80 is in the second position as best illustrated in FIG. 4.

It will be understood that such sealing arrangement 120 moves in a first vertical direction during the rotation of the first door post 40 in a clockwise direction enabling movement of the first door 80 to the second position and moves in a second vertical direction during the rotation of the first door post 40 in a counter-clockwise direction enabling movement of the first door 80 to the first position. Such second vertical direction is substantially opposite such first vertical direction.

Figure 5:
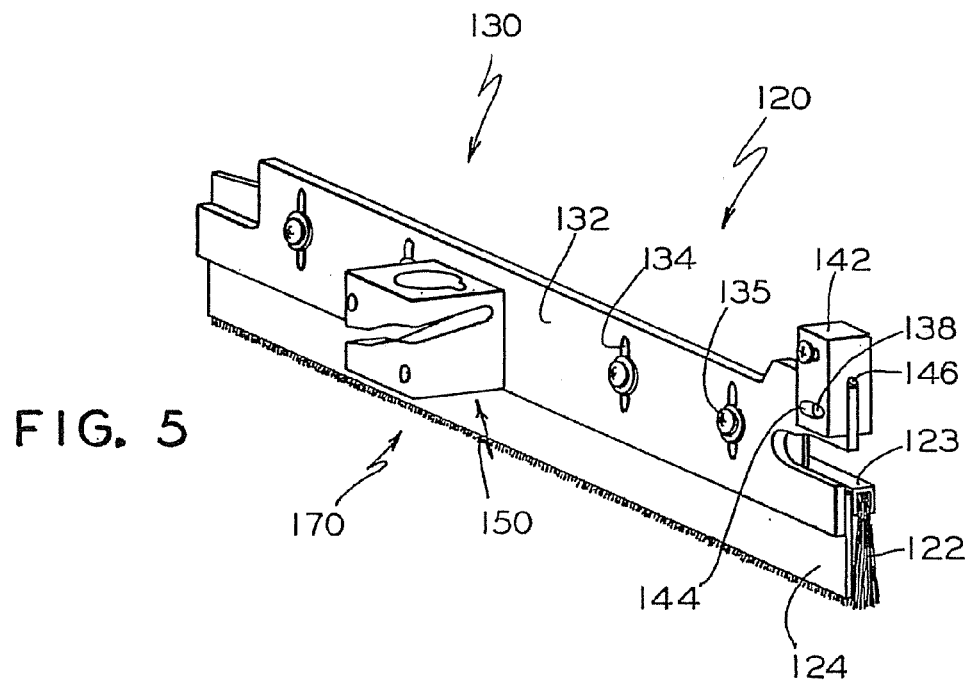
FIG. 5 is a perspective view of the sealing arrangement of the present invention.

In particular reference to FIG. 5 the sealing arrangement 120 of the present invention comprises a first sealing member 122, which is a brush, generally disposed facing the outer surface 14 of the side wall member 12 while the first door 80 is disposed in the first position. The brush 122 is attached to a body portion 132 of a mounting member, generally designated 130, with at least one fastener 135 engaging at least one mounting cavity 134 of the body portion 132. It is preferred that such mounting cavity 134 is elongated in a vertical direction to provide adjustments of the brush 122 within the portal aperture (not shown) for enabling a predetermined clearance with the floor portion 18 when the first door 80 is either in the first or the second position. A brush retainer 123 retaining the brush 122 may be attached to the body portion 132. A second sealing member 124, which is a rubber portion, may be attached to the mounting member 130 while being disposed intermediate the body portion 132 and the brush 122 for enabling improved sealing capabilities. In an alternative embodiment, such second sealing member 124 may be used independently in applications which do not require the use of the brush 122.

In further reference to FIG. 5, the sealing arrangement 120 comprises a sealing pivot means including a pivot 138 disposed within either a leading edge 96 of the first door 80 or within the mounting member 130. The pivot 138 engages an oppositely disposed pivot cavity 144. In a preferred embodiment such pivot cavity 144 is disposed within a pivot member 142 which is attached to the leading edge 96 of the first door 80. The pivot cavity 144 preferably is elongated in a horizontal direction to enable horizontal axial movement of the pivot 138 during the rotation of the first door post 40. Preferably such pivot member 142 is manufactured from a material with a low predetermined coefficient of friction including but not limited to Teflon, Delrin, Nylon, Nylotron, high molecular weight plastic, oil impregnated bronze, oil impregnated iron, or brass in order to minimize friction of the pivot 138 during the motion of the first door 80. The pivot member 142 may further include a cavity 146 engaging the edge of the body portion 132 to accommodate a predetermined configuration of the first door 80.

Figure 6:
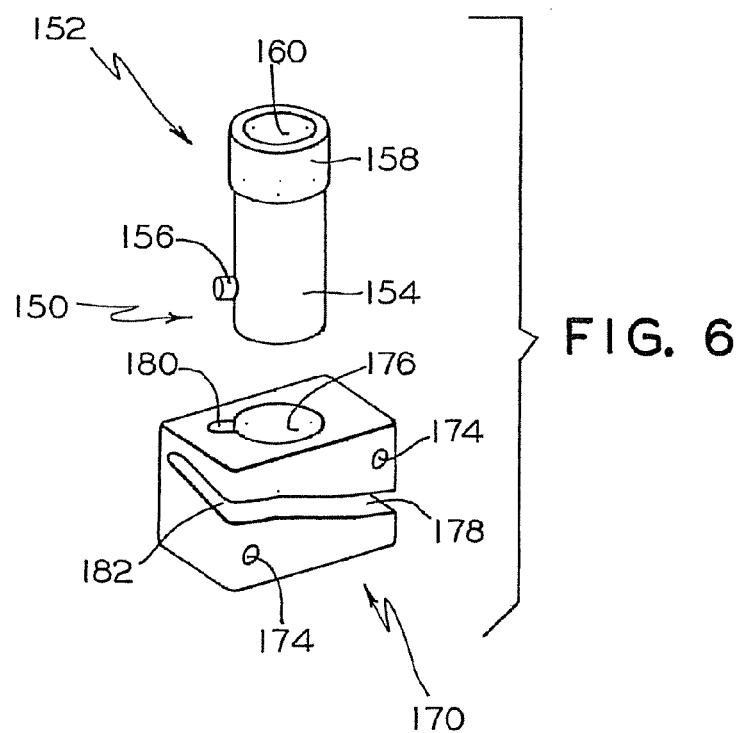
FIG. 6 is a perspective exploded view of the motion transfer means of the present invention.
Figure 7:
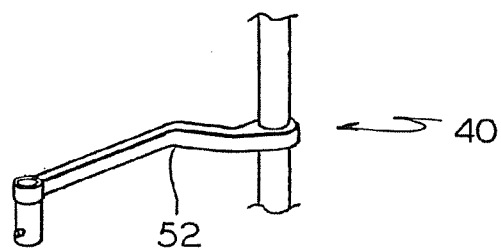
FIG. 7 is a partial perspective view of the door post of the present invention particularly illustrating the lower arm and pivot arrangement.
Figure 8:
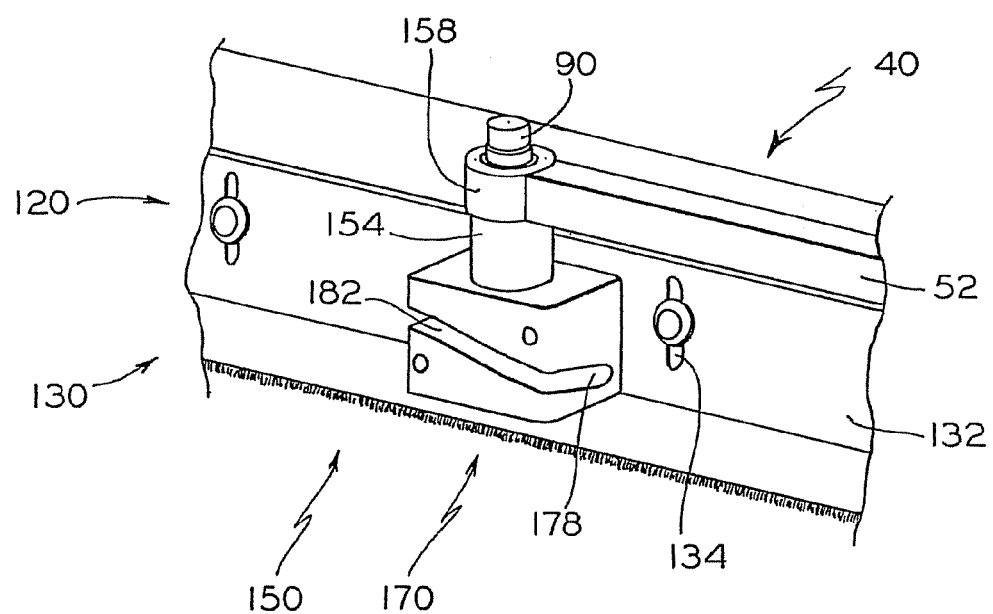
FIG. 8 is partial perspective view of the present invention particularly illustrating the interface between the sealing arrangement and lower arm of the door post.

The sealing means 120 further comprises a motion conversion means, generally designated 150, which has best been illustrated in FIGS. 6, 7 and 8. Such motion conversion means 150 includes a driving member, generally designated 152, which is adapted for attachment to the first door post 40 and a driven member, generally designated 170, which is attached to the mounting member 130. Such driven member 170 is adapted for rotary and axial motion in respect to such driving member 152 during the rotation of the first door post 40.

In the preferred embodiment, the driving member 152 has a substantially cylindrical first portion 154 with an outwardly disposed guiding portion 156 and a second portion 158. In the preferred embodiment, such second portion 158 has a cavity 160 which is concentric with the first portion 154 for engagement with the lower pivot 90. It is further preferred that such driving member 152 is rigidly attached to the first lower arm 52, as best illustrated in FIGS. 7 and 8, by any of the well known attachment means, such as welding, brazing, adhesives or mechanical fastening, or that the driving member 152 is integral to the first lower arm 52.

Driven member 170 includes at least one mounting cavity 174, a substantially cylindrical cavity 176, for cooperating with the substantially cylindrical first portion 154, a helical aperture 178 of a first predetermined pitch which cooperates with the guiding portion 156 of the driving member 152 and a mounting cavity 180 abutting such substantially cylindrical cavity 176 for enabling engagement and disengagement of the guiding portion 156 with the helix aperture 178 during an installation of the sealing arrangement 120. The mounting cavity 180 is disposed in a manner which enables a predetermined rotation of the driven member 170 without enabling the guiding portion 156 to disengage such mounting cavity 180 and, more importantly, without enabling the driven member 170 to disengage from the driving member 152. The first predetermined pitch of the helix aperture 178 enables a predetermined vertical displacement of the driven member 170 upon rotation of driving member 152 during motion of the first door 80 between such first and such second positions and, more importantly, enables cooperation of the sealing arrangement 120 with the floor portion 18.

Preferably a friction reducing means 182 is disposed within the sealing arrangement 120 to minimize friction between such helix aperture 178 and the guiding portion 156 of the driving member 152 and between such substantially cylindrical cavity 176 and the substantially cylindrical first portion 154 of driving member 152. Such friction reducing means 182 may include any well known material with a low predetermined coefficient of friction including, but not limited to, Teflon, Delrin, Nylon, Nylotron, high molecular weight plastic, oil impregnated bronze, oil impregnated iron, or brass, which is applied to helix aperture 178 and the substantially cylindrical cavity 176 or which is disposed on the guiding portion 156 or the substantially cylindrical first portion 154 but preferably such friction reducing means 182 includes driven member 170 manufactured in its entirety from the aforementioned material with a low predetermined coefficient of friction.

In an alternative embodiment, the motion of the sealing arrangement 120 in the first and the second vertical directions is achieved by driving member 152 having a threaded first portion 154 of a second predetermined pitch cooperating with a complimentary threaded cavity 176 of a third predetermined pitch of the driven member 170. The third predetermined pitch is substantially equal to the second predetermined pitch Those skilled in the art will readily understand that an aperture 188 of a predetermined size, best shown in FIG. 4, must be adapted to enable vertical movement of the sealing means 120 in applications wherein such sealing means 120 are disposed substantially planar with the first door 80 and are further disposed below the bottom edge 97 thereof. Where a requirement is mandated to cover such aperture 188 from being exposed and from creating a pinch hazard to the passenger, an inner cover 190 and an outer cover 194 may be adapted enabling such requirement. Preferably the inner cover 190 is rigidly attached to either the first door 80 or the lower arm 52 of the first door post 40.

To further minimize pinch hazards to the passenger at the bottom of the first door 80, a safety member 192, best illustrated in FIGS. 1 and 3, attached either to the inner cover 190 or to the first door 80 but preferably attached to the driven member 170 may be provided for accommodating the floor portion 18 during rotation of the first door 80. It is further preferred that such safety member 192 is of a soft material, such as rubber, capable of exerting limited force onto a passenger body part, such as foot, and, still more preferable, such safety member 192 is of a well known sensitized type to provide a signal to a control system (not shown) of the transit vehicle upon encountering the passenger preventing the first door 80 to move into the first position.

In operation it can be readily seen that rotation of the first door post 40 in a clockwise direction during the opening of the first door 80 causes the guiding portion 156 of driving member 152 to move within the helix aperture 178 enabling vertical movement of the driven member 170 in the first vertical direction in respect to the driving member 152 and, more importantly, enabling the vertical movement of the sealing means 120. The pivot cavity 144 only enables the horizontal movement of the pivot 138 causing the distal end of the sealing arrangement 120 which is disposed adjacent the trailing edge 99 to move in the first vertical direction by a greater distance providing a required alignment interface with the angular surface 19 of the floor portion 18 when such first door 80 moves into the second position.

The movement of the sealing means 120 is reversed when the first door 80 moves from the second position into the first position enabling the sealing arrangement 120 to be aligned in respect to the outer edge 21 of the floor portion 18.

Those skilled in the art will further readily understand that existing installations may be retrofitted with the sealing arrangement 120 of the present invention by incorporating a predetermined pitch of the helix aperture 178 based on the angular surface 19 of floor portion 18, configuring the second portion 158 of driving member 152 for attachment to the first door post 40, and providing a sealing arrangement 120 of a predetermined height to accommodate the angular surface 19 of the floor portion 18 during vertical movement.

While the presently preferred embodiment of the instant invention has been described in detail above in accordance with the patent statutes, it should be recognized that various other modifications and adaptations of the invention may be made by those persons who are skilled in the relevant art without departing from either the spirit of the invention or the scope of the appended claims.

The invention claimed is:

1. A door system disposed within a portal aperture of a transit vehicle having a side wall member with outer and inner surfaces, a ceiling portion adjacent said side wall member and said aperture, and a floor portion disposed adjacent said portal aperture and said side wall member, said floor portion having a level outer edge extending across said portal aperture, said floor portion extending from said outer edge at an angle with respect to a horizontal plane, said door system comprising:

(a) a door drive disposed adjacent said portal aperture, said door drive having a base attached to one of said ceiling portion and said inner surface of said side wall member, a prime mover selected from the group consisting of electrical, mechanical, pneumatic, and hydraulic prime movers, and at least one drive linkage connected to said prime mover at one end of said drive linkage;

(b) at least one door rotation enabling device disposed vertically within said transit vehicle adjacent said inner surface of said side wall member, said at least one door rotation enabling device having a first pivot connection with said at least one drive linkage, an upper arm, and a lower arm;

(c) at least one door for at least partially covering and uncovering said portal aperture, said at least one door including a door body member with a leading edge and a bottom edge, an upper portion for coupling with said upper arm, a lower portion for coupling with said lower arm, said at least one door movable between a first position disposed generally co-planar with said side wall member and a second position disposed perpendicularly to said side wall member upon rotation of said at least one door rotation enabling device, said at least one door being disposed above said floor portion in said second position; and (d) a sealing arrangement at least partially attached to said at least one door, said sealing arrangement sealingly engaged with and generally parallel to said level outer edge of said floor portion when said at least one door is in said first position and said sealing arrangement is generally parallel to said floor portion when said at least one door is in said second position, said sealing arrangement including:

(i) a mounting member having a body portion with at least one cavity;

(ii) at least one sealing member attached to said mounting member with at least one fastener engaging said at least one cavity; and (iii) a motion conversion mechanism at least partially attached to said mounting member which moves said at least one sealing member in a first vertical direction during rotation of said at least one door from said first position to said second position and which moves said at least one sealing member in a second vertical direction during rotation of said at least one door from said second position to said first position, said second vertical direction being substantially opposite said first vertical direction.

2. The door system, according to claim 1, wherein said at least one door rotation enabling device further includes a second pivot connection at said floor portion.

3. The door system, according to claim 1, wherein said at least one cavity of said mounting member is elongated in said first and said second vertical directions for providing an adjustment of said at least one sealing member, said at least one cavity further enabling a predetermined clearance of said at least one sealing member with said floor portion when said at least one door is in said first and said second positions.

4. The door system, according to claim 1, wherein said sealing arrangement further includes a retainer for retaining said at least one sealing member, said retainer attached to said mounting member intermediate said mounting member and said at least one sealing member.

5. The door system, according to claim 1, wherein said at least one sealing member is one of a brush and a rubber portion.

6. The door system, according to claim 1, wherein said motion conversion mechanism includes a driving member being attached to said lower arm, said driving member having a substantially cylindrical first portion, a guiding portion disposed outwardly from said substantially cylindrical first portion, and a second portion with a cavity disposed concentrically with said first portion, said motion conversion mechanism further including a driven member attached to said mounting member, said driven member having a substantially cylindrical cavity for cooperating with said substantially cylindrical first portion, a helical aperture having predetermined pitch for cooperating with said guiding portion of said driving member, and a mounting cavity communicating with said substantially cylindrical cavity for enabling an engagement and a disengagement of said driving member with said driven member, said driven member adapted for a rotary and a vertical motion about said driving member enabled by a rotation of said driving member relative to said driven member and by a movement of said guiding portion within said helical aperture.

7. The door system, according to claim 6, wherein said predetermined pitch enables cooperation of said sealing arrangement with said floor portion during movement of said at least one door between said first and said second positions.

8. The door system, according to claim 1, wherein said sealing arrangement further includes a sealing pivot device, said sealing pivot device includes one of a pivot and a pivot cavity attached to said mounting member of said sealing arrangement.

9. The door system, according to claim 8, wherein said sealing arrangement includes a pivot member attached to said leading edge of said at least one door, said pivot member having a pivot cavity elongated in a horizontal direction.

10. The door system, according to claim 1, wherein said door system further includes an inner cover rigidly attached to one of said at least one door and said lower arm.

11. The door system, according to claim 10, wherein said door system further includes a safety member attached to one of said inner cover, said at least one door, and a driven member for accommodating said floor portion when said at least one door is in said second position.

12. The door system, according to claim 1, wherein said door system further includes an outer cover rigidly attached to said at least one door.

* * * * *